(12) United States Patent
Wada et al.

(10) Patent No.: US 6,990,939 B2
(45) Date of Patent: Jan. 31, 2006

(54) VALVE TIMING CONTROL SYSTEM FOR INTERNAL COMBUSTION ENGINE

(75) Inventors: Katsuji Wada, Saitama-ken (JP);
Kazuya Yamamoto, Saitama-ken (JP);
Daisuke Shimizu, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 90 days.

(21) Appl. No.: 10/655,591

(22) Filed: Sep. 5, 2003

(65) Prior Publication Data

US 2004/0112343 A1    Jun. 17, 2004

(30) Foreign Application Priority Data

Sep. 6, 2002  (JP)  ............... 2002-262138

(51) Int. Cl.
*F01L 1/34*  (2006.01)
(52) U.S. Cl. ............... 123/90.17; 123/568.11
(58) Field of Classification Search ............ 123/90.15, 123/90.16, 90.17, 90.18, 90.25, 568.11, 568.14
See application file for complete search history.

(56) References Cited

U.S. PATENT DOCUMENTS

| | | | | |
|---|---|---|---|---|
| 5,666,931 A | * | 9/1997 | Pierik et al. ........... | 123/568.21 |
| 6,484,676 B2 | * | 11/2002 | Shimizu et al. .......... | 123/90.15 |
| 6,656,089 B2 | * | 12/2003 | Furukawa .................. | 477/111 |
| 6,766,775 B2 | * | 7/2004 | Riedle et al. ............ | 123/90.15 |

* cited by examiner

*Primary Examiner*—Mahmoud Gimie
(74) *Attorney, Agent, or Firm*—Arent Fox PLLC

(57) ABSTRACT

There is provided a valve timing control system for an internal combustion engine, which makes it possible to secure a right amount of combustion gases in a combustion chamber, irrespective of whether an EGR device is in operation or not, thereby obtaining a sufficient effect of reduced exhaust emissions by reduction of NOx. A crank angle position sensor and an intake pipe absolute pressure sensor detect operating conditions of the engine. An ECU determines whether the EGR device is in operation or not. A target cam phase is set in dependence on the detected operating conditions of the engine and a result of the determination as to whether the EGR device is in operation or not, and the cam phase is controlled to the target cam phase.

5 Claims, 4 Drawing Sheets

VALVE TIMING CONTROL SYSTEM FOR INTERNAL COMBUSTION ENGINE

BACKGROUND OF THE INVENTION

1. Field of the Invention

This invention relates to a valve timing control system for an internal combustion engine, which varies the cam phase of a cam relative to a crankshaft of the engine to thereby control valve timing, and more particularly to a valve timing control system of this kind, which includes an EGR device.

2. Description of the Related Art

Conventionally, a valve timing control system for an internal combustion engine has been proposed e.g. in Japanese Laid-Open Patent Publication (Kokai) No. 2001-182566. In this control system, the cam phase of an intake cam with respect to a crankshaft is changed by changing a relative angle between an intake camshaft and its driven sprocket by a cam phase change mechanism, whereby the opening/closing timing (valve timing) of an intake valve is continuously advanced or retarded. Further, in the valve timing control system, a target cam phase is set according to detected engine speed and intake pipe absolute pressure, and then the cam phase is controlled such that the actual cam phase becomes equal to the target cam phase. For instance, in a low-load operating condition of the engine, the opening/closing timing of the intake valve is advanced by setting the target cam phase to an advanced value, to thereby increase a valve overlap between the intake valve and an exhaust valve (i.e. a time period over which the two valves are both open), whereby the amount of combustion gases remaining in a combustion chamber (i.e. an internal EGR rate) is increased to lower combustion temperature within the combustion chamber, for reduction of NOx.

However, when the above conventional valve timing control system is used together with an EGR device for recirculating exhaust gases from an exhaust system of the engine to an intake system of the same, there occurs the following problem: When the EGR device is in operation, exhaust gases are introduced as combustion gases into the combustion chamber via the intake system. However, in the above valve timing control system, the target cam phase is set using only the engine speed and the intake pipe absolute pressure as parameters, irrespective of whether the EGR device is in operation or not, and hence the proportion of the amount of combustion gases remaining in the combustion chamber resulting from a combination of an EGR rate controlled by the EGR device and the internal EGR rate controlled by the valve overlap, with respect to the whole mixture in the combustion chamber, varies depending on whether the EGR device is in operation or not. As a result, the amount of combustion gases in the combustion chamber can become excessive or insufficient, which makes it difficult to obtain a sufficient effect of reduced exhaust emissions by reduction of NOx.

SUMMARY OF THE INVENTION

It is an object of the invention to provide a valve timing control system for an internal combustion engine, which makes it possible to secure a right amount of combustion gases in a combustion chamber, irrespective of whether an EGR device is in operation or not, thereby obtaining a sufficient effect of reduced exhaust emissions by reduction of NOx.

To attain the above object, the present invention provides a valve timing control system for an internal combustion engine including an EGR device for recirculating exhaust gases from an intake system thereof to an exhaust system thereof, the valve timing control system controlling valve timing by changing a cam phase which is a phase of at least one of an intake cam and an exhaust cam, relative to a crankshaft of the engine.

The valve timing control system according to the invention is characterized by comprising:

operating condition-detecting means for detecting operating conditions of the engine;

determination means for determining whether the EGR device is in operation or not;

target cam phase-setting means for setting a target cam phase in dependence on the detected operating conditions of the engine and a result of determination of whether the EGR device is in operation or not; and control means for providing control such that the cam phase becomes equal to the target cam phase set by the target cam phase-setting means.

According to this valve timing control system, the target cam phase is set in dependence on operating conditions of the internal combustion engine, and then the cam phase is controlled such that it becomes equal to the target cam phase set by the target cam phase-setting means. Further, whether the EGR device is in operation or not is determined by the determination means, and the target cam phase is set in dependence on a result of the determination of whether the EGR device is in operation or not. This setting of the target cam phase makes it possible to change the valve overlap between the intake valve and the exhaust valve in dependence on whether the EGR device is in operation or not, to thereby properly control an internal EGR rate. Thus, it is possible to secure a right amount of combustion gases resulting from a combination of an EGR rate controlled by the EGR device and the internal EGR rate, thereby obtaining a sufficient effect of reduced exhaust emissions by reduction of NOx.

Preferably, the target cam phase-setting means sets the target cam phase to a predetermined fixed value when the determination means determines that the EGR device is in operation.

According to this preferred embodiment, when the EGR device is in operation, since the target cam phase is set to the predetermined fixed value and hence does not change, other control operations for the engine, such as control of a fuel injection period and control of ignition timing, are not required to be executed according to changes in the target cam phase, which facilitates these control operations.

Alternatively, the target cam phase-setting means sets the target cam phase in dependence on the operating conditions of the engine when the determination means determines that the EGR device is in operation.

According to this preferred embodiment, when the EGR device is in operation, since the target cam phase is set in dependence on detected operating conditions of the engine, it is possible to set the target cam phase for EGR operation to an optimal value depending on the actual rotational speed and load conditions of the engine, thereby optimally securing the internal EGR rate, and hence securing the amount of combustion gases in the combustion chamber.

Preferably, the valve timing control system further comprises demanded EGR rate-calculating means for calculating a demanded EGR rate at which exhaust gases should be introduced into the engine, based on the operating conditions of the engine, and when the determination means determines that the EGR device is in operation, and when the calculated demanded EGR rate is equal to or higher than a predetermined rate, the target cam phase-setting means sets the target cam phase in a direction of increasing a valve overlap between the intake valve and the exhaust valve.

According to this preferred embodiment, the demanded EGR rate at which exhaust gases should be introduced into the engine is calculated, based on the operating conditions of the internal combustion engine. Further, when the EGR device is in operation, and when the calculated demanded EGR rate is equal to or higher than the predetermined rate, the target cam phase is set in the direction of increasing the valve overlap between the intake valve and the exhaust valve. The predetermined rate is set e.g. to a value corresponding to a maximum EGR rate at which exhaust gases can be returned to the engine. Therefore, when the engine is demanding an EGR rate in excess of the maximum EGR rate at which exhaust gases can be returned by the EGR device, the target cam phase is set as above, to thereby increase the valve overlap. As a result, the internal EGR rate is increased to make up for shortage of the EGR rate, whereby a required amount of combustion gases can be secured.

More preferably, when the determination means determines that the EGR device is in operation, and when the demanded EGR rate is equal to or higher than the predetermined rate, the target cam phase-setting means sets the target cam phase such that as the demanded EGR rate is higher, the degree of the valve overlap between the intake valve and the exhaust valve becomes larger.

According to this preferred embodiment, when the demanded EGR rate is equal to or higher than the predetermined rate, the target cam phase is set such that as the demanded EGR rate is higher, the degree of the valve overlap between the intake valve and the exhaust valve becomes larger. Therefore, it is possible to increase the internal EGR rate properly according to the degree of the demanded EGR rate, thereby securing the right amount of required combustion gases.

The above and other objects, features, and advantages of the invention will become more apparent from the following detailed description taken in conjunction with the accompanying drawings.

DETAILED DESCRIPTION OF PREFERRED EMBODIMENT

Figure 1:
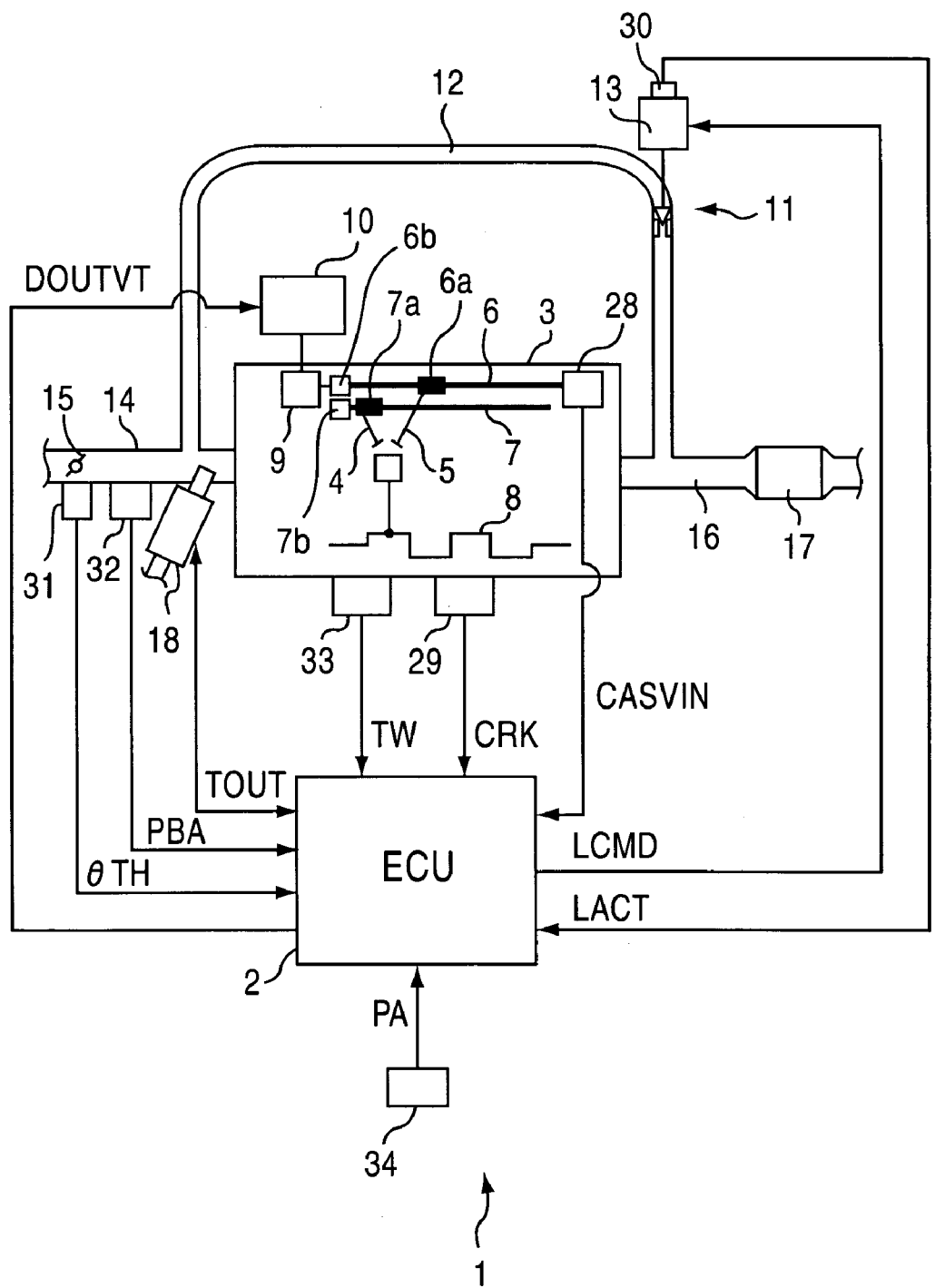
FIG. 1 is a diagram schematically showing the arrangement of an internal combustion engine incorporating a valve timing control system according to an embodiment of the invention.

The invention will now be described in detail with reference to the drawings showing an embodiment thereof. Referring first to FIG. 1, there is schematically shown the arrangement of an internal combustion engine incorporating a valve timing control system (hereinafter simply referred to as "the control system") according to an embodiment of the invention. As shown in FIG. 1, the control system 1 includes an ECU 2. The ECU 2 carries out control processes, described hereinbelow, in dependence on operating conditions of the internal combustion engine (hereinafter simply referred to as "the engine") 3.

The engine 3 is a four-stroke cycle DOHC gasoline engine, for example, which includes an intake camshaft 6 and an exhaust camshaft 7. The intake and exhaust camshafts 6, 7 are connected to a crankshaft 8 by their respective driven sprockets 6b, 7b, and a timing chain, not shown, for rotating through 360 degrees as the crankshaft 8 rotates through 720 degrees. The intake camshaft 6 is integrally formed with a plurality of intake cams 6a (only one of which is shown) for opening and closing respective intake valves 4 (only one of which is shown), and the exhaust camshaft 7 is integrally formed with a plurality of exhaust cams 7a (only one of which is shown) for opening and closing respective exhaust valves 5 (only one of which is shown).

Further, the intake camshaft 6 is rotatably connected to the driven sprocket 6b associated therewith such that the intake camshaft 6 can be rotated or turned within a range of a predetermined angle. By changing a relative angle of the intake camshaft 6 to the driven sprocket 6b, the phase angle (hereinafter simply referred to as "the cam phase") CAIN of each intake cam 6a relative to the crankshaft 8 is changed to advance or retard the opening/closing timing (valve timing) of the intake valve 4. Arranged at one end of the intake camshaft 6 are a cam phase change mechanism (hereinafter referred to as "the VTC") 9 for controlling the cam phase CAIN, and a hydraulic pressure control valve 10.

The VTC 9 includes an advance chamber, not shown, and a retard chamber, not shown, which are defined on opposite sides of a vane, not shown, integrally formed with the intake camshaft 6, and is configured such that hydraulic pressure from an oil pump, not shown, driven by the engine 3 is selectively supplied to the advance chamber or the retard chamber under control of the hydraulic pressure control valve 10 to thereby turn the intake camshaft 6 in an advancing direction or a retarding direction relative to the driven sprocket 6b.

The hydraulic pressure control valve 10 is formed by a duty solenoid valve which includes a solenoid, and a spool driven by a force generated by the solenoid, neither of which is shown. The hydraulic pressure control valve 10 is constructed such that the position of the spool thereof is continuously changed according to an output duty factor DOUTVT (hereinafter simply referred to as "the duty factor DOUTVT") of solenoid current supplied to the solenoid, which is controlled by the ECU 2. The advance chamber or retard chamber of the VTC 9 is opened and closed depending on the position of the spool. More specifically, when the duty factor DOUTVT of the solenoid current supplied to the hydraulic pressure control valve 10 is larger than a hold duty factor value (e.g. 50%) for holding the cam phase, the spool of the hydraulic pressure control valve 10 is moved from its neutral position toward one side to open the advance chamber, whereby the hydraulic pressure is supplied to the advance chamber to place the VTC 9 in a state advancing the cam phase CAIN. On the other hand, when the duty factor DOUTVT is smaller than the hold duty factor value, the spool is moved from its neutral position toward the other side to open the retard chamber, whereby the hydraulic pressure is supplied to the retard chamber to place the VTC 9 in a state retarding the cam phase CAIN. It should be noted that the intake cam 6a can be moved through 60 crank angle degrees, assuming 25 crank angle degrees BTDC when it is in its most retarded position and 85 crank angle degrees BTDC when it is in the most advanced position. The cam phase CAIN is 0 crank angle degrees when the intake cam 6a is in its most retarded position, and 60 crank angle degrees when the intake cam 6a is in its most advanced position.

Further, when the duty factor DOUTVT is equal to the hold duty factor value, the hydraulic pressure control valve 10 is placed in a cam phase-holding state in which the spool thereof is located in its neutral position for simultaneously closing the advance chamber and the retard chamber. In this state, supply of the hydraulic pressure to the advance chamber and the retard chamber is cut off, and the intake camshaft 6 and the driven sprocket 6b are fixedly connected to each other, whereby the cam phase CAIN is held at a value to which it has been controlled by the VTC 9.

A cam angle sensor 28 is disposed at the other end of the intake camshaft 6, opposite to the one end at which the VTC 9 is arranged. The cam angle sensor 28 is comprised e.g. of a magnet rotor and an MRE pickup, and detects a cam angle CASVIN of the intake cam 6a measured with respect to a TDC position and delivers a signal indicative of the sensed cam angle CASVIN to the ECU 2. Further, the crankshaft 8 has a crank angle position sensor 29 provided therefor. The crank angle position sensor 29 is constructed similarly to the above cam angle sensor 28, and delivers a CRK signal as a pulse signal to the ECU 2 whenever the crankshaft 8 rotates through a predetermined angle (e.g. 30 degrees). The ECU 2 calculates (detects) an actual cam phase CAIN based on the CRK signal and the CASVIN signal (hereinafter, the cam phase actually detected is referred to as "the actual cam phase CAIN" as required). Further, the ECU 2 determines an engine speed NE based on the CRK signal.

Further, although not shown, the intake cams 6a and the exhaust cams 7a are each comprised of a low-speed cam, and a high-speed cam having a higher cam nose than that of the low-speed cam. Each of the intake and exhaust cams can be switched by a valve timing changeover mechanism (hereinafter referred to as "the VTEC"), not shown, between the low-speed cam and the high-speed cam, whereby the valve timing (lift curve) of the intake valve 4 or the exhaust valve 5 is changed between a low-speed valve timing (hereinafter referred to as "Lo. V/T") and a high-speed valve timing (hereinafter referred to as "Hi. V/T"). Similarly to the VTC 9, the VTEC also has its operation controlled by the ECU 2 which controls the hydraulic pressure to be supplied to the VTEC via a hydraulic pressure control valve, not shown.

The engine 3 has an EGR device 11 for recirculating exhaust gases from an exhaust system of the engine to an intake system of the same so as to reduce NOx and other emissions. The EGR device 11 is comprised of an EGR pipe 12 for returning exhaust gases, and an EGR control valve 13 disposed in an intermediate portion of the EGR pipe 12. The EGR pipe 12 has one end thereof connected to an intake pipe 14 (intake system) at a location downstream of a throttle valve 15 and the other end thereof connected to an exhaust pipe 16 (exhaust system) at a location upstream of a three-way catalyst 17. The EGR control valve 13 is formed by a linear solenoid valve. A valve lift LACT of the EGR control valve 13 is controlled linearly in response to a drive signal from the ECU 2, whereby the EGR control valve 13 controls the opening/closing and the opening degree of the EGR pipe 12, i.e. the operation/stoppage of the EGR device 11 and the EGR rate.

The valve lift LACT of the EGR control valve 13 is detected by a valve lift sensor 30, and a signal indicative of the sensed valve lift LACT is delivered to the ECU 2. The ECU 2 calculates the EGR rate according to the operating conditions of the engine 3, and then calculates a target valve lift LCMD of the EGR control valve 12 based on the obtained EGR rate. The ECU 2 delivers a drive signal generated based on the target valve lift LCMD to the EGR control valve 13 to thereby control the EGR control valve 13 such that the actual valve lift LACT becomes equal to the target valve lift LCMD.

Inserted to the intake pipe 14 of the engine 3 is a throttle valve opening sensor 31 which detects an opening degree θTH of the throttle valve 15 (hereinafter referred to as "the throttle valve opening θTH"). Further, an intake air pressure sensor 32 is inserted into the intake pipe 14, for detecting an absolute pressure PBA within the intake pipe 14 (hereinafter referred to as "the intake pipe absolute pressure PBA") at a location downstream of the throttle valve 15. The sensors 31 and 32 deliver respective signals indicative of the sensed throttle valve opening θTH and intake pipe absolute pressure PBA to the ECU 2. The intake pipe 14 has an intake port, not shown, in the vicinity of which injectors 18 (only one of which is shown) are inserted. Each injector 18 has its fuel injection time period (fuel injection amount) TOUT controlled by a drive signal delivered from the ECU 2.

Further, the ECU 2 receives a signal indicative of a temperature TW of an engine coolant circulating through the cylinder block of the engine 3 (hereinafter referred to as "the engine coolant temperature TW"), which is sensed by an engine coolant temperature sensor 33, and a signal indicative of the atmospheric pressure PA sensed by an atmospheric pressure sensor 34.

The ECU 2 forms, in the present embodiment, operating condition-detecting means, determination means, target cam phase-setting means, control means, and demanded EGR amount-calculating means. The ECU 2 is formed by a microcomputer including an I/O interface, a CPU, a RAM, and a ROM, none of which are shown. The signals from the above sensors 28 to 34 are each input to the CPU after execution of A/D conversion and waveform shaping by the I/O interface.

The CPU 2 determines operating conditions of the engine 3 based on these signals, and in dependence on the determined operating conditions of the engine 3 and the operating state of the EGR device 11, calculates a target cam phase CAINCMD of the VTC 9 in the manner described hereinbelow, according to a control program and data read from the ROM.

Figure 2:
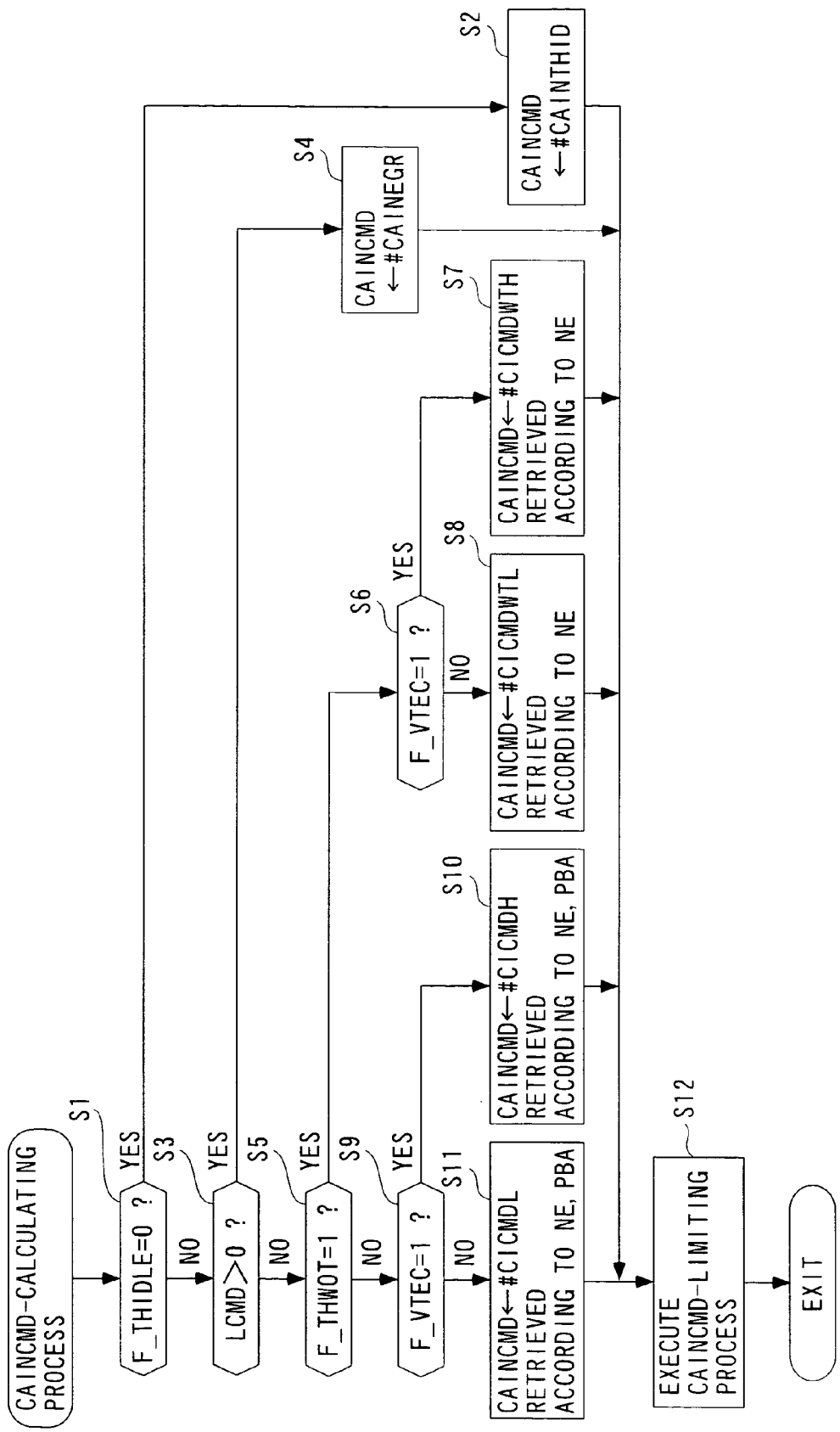
FIG. 2 is a flowchart showing a routine for carrying out a process for calculating a target cam phase.

FIG. 2 is a flowchart showing a process for calculating the target cam phase CAINCMD. It should be noted that in the following description, fixed values stored beforehand in the ROM as data items and table values are discriminated from other variables that are stored in the RAM and updated, by adding a character # to each of respective reference marks for the fixed values. In this process, first in a step 1 (in the figure, shown as "S1", which rule applies similarly in the following description), it is determined whether or not a fully-closed throttle flag F_THIDLE assumes 0. If the answer to the question is affirmative (YES), i.e. if the throttle valve 15 is substantially fully closed e.g. in the idle operation of the engine 3, the target cam phase CAINCMD is set to a predetermined most retarded value #CAINTHID (e.g. 0°) (step 2).

If the answer to the question of the step 1 is negative (NO), it is determined whether or not the target valve lift LCMD of the EGR control valve 13 currently set is larger than a value of 0 (step 3). If the answer to the question is affirmative (YES), i.e. if LCMD>0 holds, which means that the EGR device 11 is operation to execute EGR operation, the target cam phase CAINCMD is set to a fixed cam phase

CAINEGR for EGR operation (e.g. 10 crank angle degrees) (fixed value) (step 4).

If the answer to the question of the step 3 is negative (NO), i.e. if the EGR device 11 is not in operation, it is determined whether or not a throttle wide-open flag F_THWOT assumes 1 (step 5). If the answer to the question is affirmative (YES), i.e. if the throttle valve 15 is substantially fully open, it is determined whether or not a VTEC flag F_VTEC assumes 1 (step 6). If the answer to the question is affirmative (YES), i.e. if the engine 3 is being operated with the Hi. V/T by the VTEC, a table value. #CICMDWTH for the wide-open throttle Hi. V/T is retrieved from a table, not shown, according to the engine speed NE, and the target cam phase CAINCMD is set to the table value #CICMDWTH (step 7). On the other hand, if the answer to the question of the step 6 is negative (NO), i.e. if the engine 3 is being operated with the Lo. V/T, a table value #CICMDWTL for the wide-open throttle Lo. V/T is retrieved from a table, not shown, which is set separately from the above table, according to the engine speed NE, and the target cam phase CAINCMD is set to the table value #CICMDWTL (step 8). These table values #CICMDWTH, #CICMDWTL are each set, according to the engine speed NE, to a value which makes it possible to obtain a maximum output torque.

If the answer to the question of the step 5 is negative (NO), i.e. if the throttle valve 15 is not substantially fully open, similarly to the step 6, determination as to the VTEC flag F_VTEC is carried out (step 9). If the engine 3 is operating with the Hi. V/T, a map value #CICMDH for the non-wide-open throttle Hi. V/T is retrieved from a map, not shown, according to the engine speed NE and the intake pipe absolute pressure PBA, and the target cam phase CAINCMD is set to the map value #CICMDH (step 10). On the other hand, if the engine 1 is operating with the Lo. V/T, a map value #CICMDL for the non-wide-open throttle Lo. V/T is retrieved from a map, not shown, which is set separately from the above map, and the target cam phase CAINCMD is set to the map value #CICMDL (step 11). These map values #CIMDH, #CIMDL are each set, according to the engine speed NE and the intake pipe absolute pressure PBA, to a value which makes it possible to obtain best fuel economy.

Then, a limiting process of the target cam phase CAINCMD set as above is carried out (step 12), followed by terminating the present process. This limiting process is executed so as to limit the target cam phase CAINCMD according to the atmospheric pressure PA. More specifically, upper limit values CLMTPAX each preset to smaller values as the atmospheric pressure PA is lower are stored in a table, and when the target cam phase CAINCMD exceeds the upper limit value CLMTPAX retrieved from the table according to the atmospheric pressure PA, the target cam phase CAINCMD is set to the upper limit value CLMTPAX. The execution of the limiting process makes it possible to prevent the internal EGR rate from being excessively increased with respect to the amount of intake air when the amount of intake air is substantially decreased due to the lowering of the atmospheric pressure PA.

Thereafter, although not shown, the duty factor DOUTVT is calculated by feedback control according to the target cam phase CAINCMD calculated as above and the detected actual cam phase CAIN, and then a drive signal based on the result of the calculation is delivered to the hydraulic pressure control valve 10, whereby the cam phase CAIN is controlled to the target cam phase CAINCMD.

As described above, according to the present embodiment, whether the EGR device 11 is in operation or not is determined based on the target valve lift LCMD (step 3), and when the EGR device 11 is in operation, the target cam phase CAINCMD is set to the fixed cam phase #CAINEGR for EGR operation (step 4). On the other hand, when the EGR device 11 is not in operation, the target cam phase CAINCMD is set according to the engine speed NE and/or the intake pipe absolute pressure PBA (steps 7, 8, 10, 11). By setting the target cam phase CAINCMD as above, the valve overlap between the intake valve 4 and the exhaust valve 5 is changed in dependence on whether the EGR device 11 is in operation or not, whereby the internal EGR rate can be properly controlled. Therefore, irrespective of whether the EGR device 11 is in operation or not, it is possible to secure a right amount of combustion gases resulting from a combination of the EGR rate controlled by the EGR device 11 and the internal EGR rate, thereby obtaining a sufficient effect of reduced exhaust emissions by reduction of NOx.

Further, when the EGR device 11 is in operation, since the target cam phase CAINCMD is set to the fixed cam phase #CAINEGR for EGR operation and hence does not change, other control operations for the engine, such as control of a fuel injection period TOUT and control of ignition timing, are not required to be executed according to changes in the target cam phase CAINCMD, which facilitates these control operations.

Figure 3:
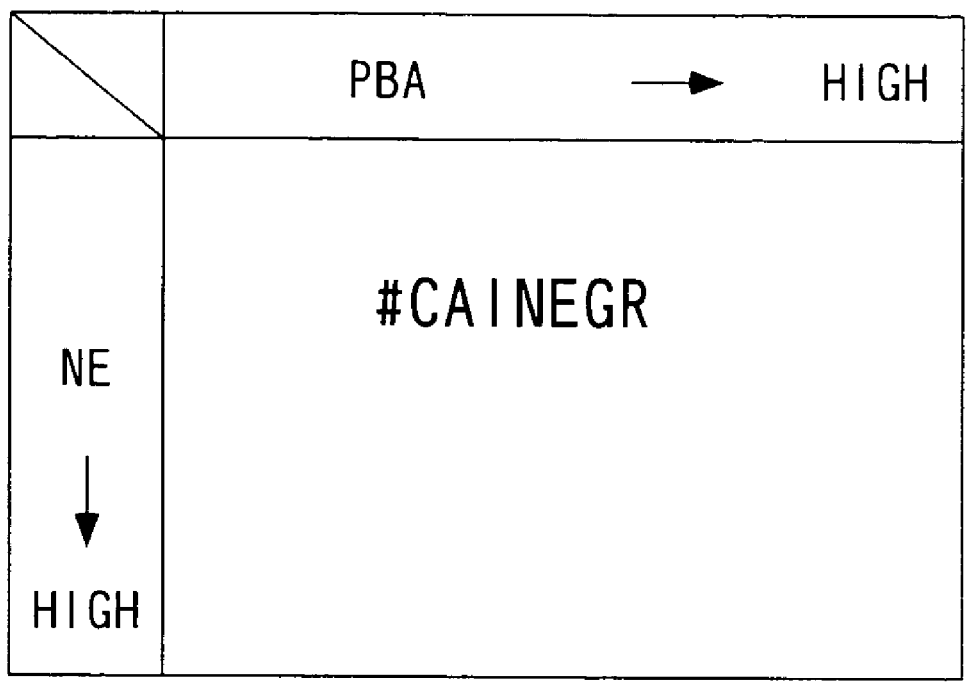
FIG. 3 shows an example of a map for use in setting a cam phase for EGR operation.

It should be noted that although in the above embodiment, the cam phase #CAINEGR for EGR operation is set to a fixed value, this is not limitative, but it may be changed according to operating conditions of the engine 3. FIG. 3 illustrates a map showing an example thereof. In this map, the cam phase #CAINEGR for EGR operation is set using the engine speed NE and the intake pipe absolute pressure PBA as parameters. This setting makes it possible to set the target cam phase CAINCMD for EGR operation to an optimal value depending on the actual rotational speed and load conditions of the engine 3, thereby optimally securing the internal EGR rate, and hence the amount of combustion gases.

Figure 4:
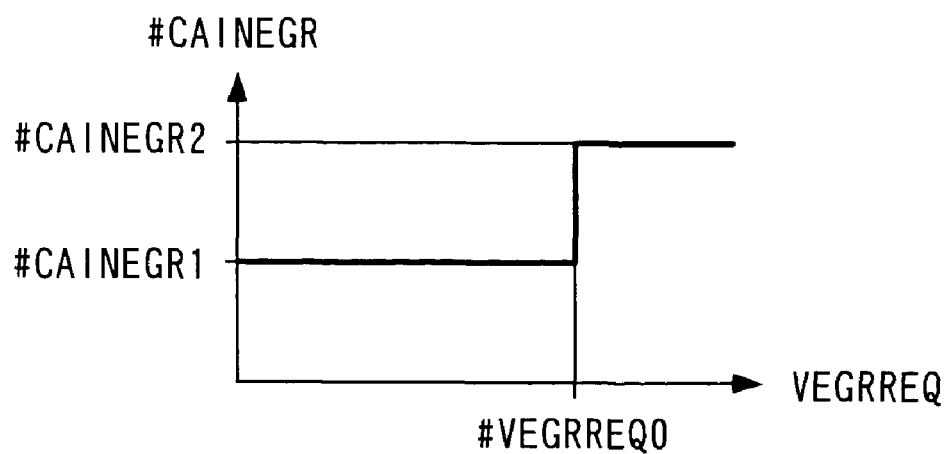
FIG. 4 shows an example of a table for use in setting the cam phase for EGR operation.
Figure 5:
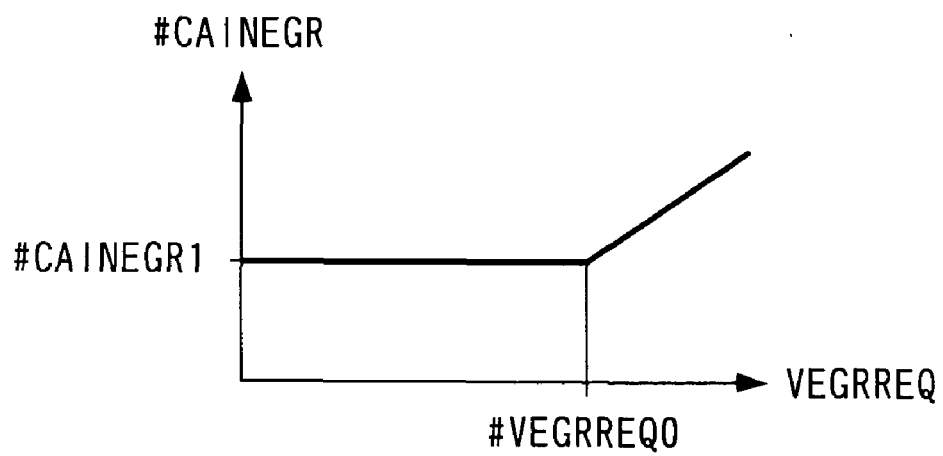
FIG. 5 shows another example of the table for use in setting the cam phase for EGR operation.

FIGS. 4 and 5 each show an example of a table in which the cam phase #CAINEGR for EGR operation is set according to a demanded EGR rate VEGRREQ. This demanded EGR rate VEGRREQ represents an EGR rate at which exhaust gases should be returned to the engine 3, and is set, according to the engine speed NE, the intake pipe absolute pressure PBA, and the engine coolant temperature TW, to such a value that makes it possible to achieve reduction of NOx and improvement of fuel economy in a well balanced manner. In the table shown in FIG. 4, when the demanded EGR rate VEGRREQ is lower than a predetermined rate #VEGRREQ0, the cam phase #CAINEGR for EGR operation is set to a first predetermined value #CAINEGR1 (e.g. 10 crank angle degrees), and when the demanded EGR rate VEGRREQ is equal to or higher than the predetermined rate #VEGRREQ0, the cam phase #CAINEGR is set to a second predetermined value #CAINEGR2 (e.g. 30 crank angle degrees). The predetermined rate #VEGRREQ0 corresponds to a maximum EGR rate, i.e. the maximum rate at which exhaust gases can be returned to the engine 3 when the EGR control valve 13 is in its full lift (fully-opened) state.

Therefore, when the engine 3 is demanding an EGR rate in excess of the maximum EGR rate at which exhaust gases can be returned by the EGR device 11, the target cam phase CAINCMD is set to a larger value by setting the cam phase #CAINEGR for EGR operations as described above, to thereby advance the cam phase CAIN to increase the valve overlap. The increased valve overlap increases the internal EGR rate to make up for the shortage of the EGR rate, whereby a required amount of combustion gases can be secured.

Further, FIG. 5 shows a variation of the FIG. 4 table, which is different in setting from the FIG. 4 table. In the FIG. 5 table, when the demanded EGR rate VEGRREQ is equal to or higher than the predetermined rate #VEGRREQ0, the cam phase #CAINEGR for EGR operation is linearly set such that it assumes a larger value as the VEGRREQ value is larger. This setting makes it possible to increase the internal EGR rate appropriately according to the amount of combustion gases demanded by the engine 3, thereby properly securing the amount of required combustion gases.

It should be noted that the present invention is not necessarily limited to the embodiment described above, but can be practiced in various forms. For instance, although in the FIG. 3 example, the engine speed NE and the intake pipe absolute pressure PBA are used as parameters representative of operating conditions of the engine 3, for setting the cam phase #CAINEGR for EGR operation, this is not limitative, but it is possible to use another appropriate parameter, such as the degree of opening of an accelerator pedal, representative of an operating condition of the engine 3, in place of or in addition to the above parameters. Further, although in the above embodiment, the present invention is applied to the valve timing control system in which the intake cam phase is variable, the invention is also applicable to a valve timing control system in which the exhaust cam phase, or both the intake cam phase and the exhaust cam phase are variable.

It is further understood by those skilled in the art that the foregoing is a description of preferred embodiments of the invention, and that various changes and modifications may be made without departing from the spirit and scope thereof.

What is claimed is:

1. A valve timing control system for an internal combustion engine including an EGR device for recirculating exhaust gases to an intake system thereof from an exhaust system thereof, the valve timing control system controlling valve timing by changing a cam phase which is a phase of at least one of an intake cam and an exhaust cam, relative to a crankshaft of the engine, the valve timing control system comprising:

operating condition-detecting means for detecting operating conditions of the engine;
  determination means for determining whether the EGR device is in operation or not;
  target cam phase-setting means for setting a target cam phase in dependence on the detected operating conditions of the engine and a result of determination of whether the EGR device is in operation or not; and
  control means for providing control such that the cam phase becomes equal to the target cam phase set by said target cam phase-setting means.

2. A valve timing control system as claimed in claim 1, wherein said target cam phase-setting means sets the target cam phase to a predetermined fixed value when said determination means determines that the EGR device is in operation.

3. A valve timing control system as claimed in claim 1, wherein said target cam phase-setting means sets the target cam phase in dependence on the operating conditions of the engine when said determination means determines that the EGR device is in operation.

4. A valve timing control system as claimed in claim 1, further comprising demanded EGR rate-calculating means for calculating a demanded EGR rate at which exhaust gases should be introduced into the engine, based on the operating conditions of the engine,
  wherein when said determination means determines that the EGR device is in operation, and when the calculated demanded EGR rate is equal to or higher than a predetermined rate, said target cam phase-setting means sets the target cam phase in a direction of increasing a valve overlap between the intake valve and the exhaust valve.

5. A valve timing control system as claimed in claim 4, wherein when said determination means determines that the EGR device is in operation, and when the demanded EGR rate is equal to or higher than the predetermined rate, said target cam phase-setting means sets the target cam phase such that as the demanded EGR rate is higher, the degree of the valve overlap between the intake valve and the exhaust valve becomes larger.

* * * * *